United States Patent
Khalil et al.

(10) Patent No.: US 9,574,880 B2
(45) Date of Patent: Feb. 21, 2017

(54) MEMS BASED RING LASER GYROSCOPE WITH REDUCED LOCK-IN

(71) Applicants: Si-Ware Systems, Cairo (EG); King Abdulaziz City for Science and Technology, Riyadh (SA)

(72) Inventors: Diaa A. M. Khalil, Cairo (EG); Khaled Hassan Mohamed Ahmed, Cairo (EG); Ahmed Saeed Shebl Salem, Cairo (EG); Mrwan Alayed, Riyadh (SA); Fahad Aljekhedab, Riyadh (SA)

(73) Assignees: KING ABDULAZIZ CITY FOR SCIENCE AND TECHNOLOGY, Riyadh (SA); SI-WARE SYSTEMS, Cairo (EG)

( * ) Notice: Subject to any disclaimer, the term of this patent is extended or adjusted under 35 U.S.C. 154(b) by 224 days.

(21) Appl. No.: 13/630,792

(22) Filed: Sep. 28, 2012

(65) Prior Publication Data
US 2013/0083327 A1    Apr. 4, 2013

Related U.S. Application Data

(60) Provisional application No. 61/540,971, filed on Sep. 29, 2011.

(51) Int. Cl.
*G01C 19/70*    (2006.01)
*G01C 19/66*    (2006.01)

(52) U.S. Cl.
CPC ........... *G01C 19/70* (2013.01); *G01C 19/661* (2013.01)

(58) Field of Classification Search
CPC ...................................... G01C 19/70
USPC ................................................ 356/459
See application file for complete search history.

(56) References Cited

U.S. PATENT DOCUMENTS

| | | | | |
|---|---|---|---|---|
| 3,373,650 A | * | 3/1968 | Killpatrick | 356/472 |
| 4,410,276 A | | 10/1983 | Ljung et al. | |
| 4,411,527 A | * | 10/1983 | Gamertsfelder | H01S 3/083 356/468 |
| 4,422,762 A | * | 12/1983 | Hutchings | H01S 3/083 356/473 |
| 4,444,502 A | | 4/1984 | Ljung | |
| 4,473,297 A | | 9/1984 | Simpson et al. | |

(Continued)

FOREIGN PATENT DOCUMENTS

| | | |
|---|---|---|
| EP | 1219926 B1 | 10/2010 |
| JP | 2001050753 A | 2/2001 |
| JP | 2006242817 A | 9/2006 |

OTHER PUBLICATIONS

International Searching Authority; International Search Report and Written Opinion; International Application No. PCT/US12/58017; Feb. 15, 2013; 13 pgs.

*Primary Examiner* — Tarifur Chowdhury
*Assistant Examiner* — Omar Nixon
(74) *Attorney, Agent, or Firm* — Loza & Loza, LLP; Holly L. Rudnick

(57) ABSTRACT

A ring laser gyroscope (RLG) includes moveable mirrors and a Micro-Electro-Mechanical Systems (MEMS) actuator coupled to the moveable mirrors to cause a respective displacement thereof that induces a phase modulation on counter-propagating light beams relative to one another. The induced phase modulation creates an optical path difference between the counter-propagating light beams corresponding to a virtual rotation that reduces the lock-in of the RLG.

16 Claims, 11 Drawing Sheets

(56) References Cited

U.S. PATENT DOCUMENTS

| | | | | |
|---|---|---|---|---|
| 4,627,732 | A | * | 12/1986 | Braun .................... G01P 3/366 356/467 |
| 4,938,556 | A | * | 7/1990 | Digonnet et al. ........ 359/341.31 |
| 4,968,136 | A | | 11/1990 | Lim et al. |
| 5,080,487 | A | * | 1/1992 | Martin ................ G01C 19/667 356/467 |
| 5,137,358 | A | * | 8/1992 | Perkins .................. H01S 3/083 356/473 |
| 5,166,949 | A | | 11/1992 | Perlmutter |
| 5,359,413 | A | * | 10/1994 | Chang .................... G01C 19/70 356/469 |
| 5,416,583 | A | | 5/1995 | Sanzari |
| 5,420,685 | A | | 5/1995 | Podgorski |
| 5,450,197 | A | * | 9/1995 | Karpinski, Jr. ............... 356/473 |
| 5,469,257 | A | * | 11/1995 | Blake .................. G01C 19/721 356/464 |
| 5,469,258 | A | | 11/1995 | Grasso |
| 5,606,416 | A | | 2/1997 | Son et al. |
| 5,960,022 | A | | 9/1999 | Halldorsson et al. |
| 2006/0268398 | A1 | * | 11/2006 | Cole et al. .................... 359/344 |
| 2007/0222971 | A1 | * | 9/2007 | Brauns ............................ 356/28 |
| 2008/0094636 | A1 | * | 4/2008 | Jin et al. ....................... 356/466 |
| 2008/0239299 | A1 | * | 10/2008 | Cole ............................. 356/128 |
| 2009/0021744 | A1 | | 1/2009 | Akanuma et al. |
| 2009/0237675 | A1 | * | 9/2009 | Nishizawa et al. ........... 356/511 |
| 2010/0194237 | A1 | * | 8/2010 | Harvey et al. ................ 310/309 |
| 2010/0309473 | A1 | * | 12/2010 | Sanders ................ G01R 15/246 356/460 |

* cited by examiner

MEMS BASED RING LASER GYROSCOPE WITH REDUCED LOCK-IN

CROSS REFERENCE TO RELATED PATENTS

The present U.S. Utility patent application claims priority pursuant to 35 U.S.C. §119(e) to the following U.S. Provisional Patent Application Ser. No. 61/540,971, entitled "MEMS Based Ring Laser Gyroscope (RLG) with Reduced Lock-in," filed Sep. 29, 2011, pending, which is incorporated herein by reference in its entirety and made part of the present International Application for all purposes:

BACKGROUND OF THE INVENTION

Technical Field of the Invention

The present invention relates in general to ring laser gyroscope designs, and in particular to the use of Micro Electro-Mechanical System (MEMS) technology in ring laser gyroscope designs.

Description of Related Art

Ring laser gyroscopes (RLGs) are instruments that measure the angular rotation rate of a certain platform. An RLG typically includes a laser system designed and fabricated to work in a ring configuration. The most familiar form of an RLG is built using a helium-neon (HN) ring laser with a diameter in the range of 30 cm.

The operating principle of an RLG is based on the beating between two counter propagating beams of light in the ring laser cavity. At stationary state, the two beams travel the same distance around the cavity, and thus have the same operating wavelength (optical frequency). When the system is rotated with a certain specific angular rotation rate, one beam experiences a larger distance around the cavity than the other due to the Sagnac effect, and as a result, the two beams are generated at two different wavelengths. The optical path difference between the two beams is directly proportional to the rotation rate of the cavity, and similarly, the optical frequency difference. Such a difference can be detected as a beating frequency between the two waves propagating in the ring laser in the clockwise (CW) and counter clockwise (CCW) directions.

To reduce the cost and size of RLGs, semiconductor lasers have recently been suggested to be used. However, as the scale factor of the RLG is directly proportional to the area enclosed by the rotating beams, the miniaturization of the RLG by using integrated semiconductor ring laser technology may greatly affect its performance. Therefore, semiconductor lasers have been proposed to be used with an optical fiber ring to increase the area of the device, and consequently improve its scale factor and sensitivity.

One of the main problems in RLG systems is coupling and lock-in between the two propagating beams at low rotation rates. Due to the nature of the optical cavity, a scattering mechanism takes place at the reflector interfaces. Such scattering causes energy to be coupled from the CW beam to the CCW beam and vice-versa. This coupling can cause the two beams to be pulled to the same frequency in a phenomenon called mode locking, which seriously limits the sensitivity of RLG devices.

Various approaches to eliminate or reduce lock-in in RLG have been suggested in recent years. One approach uses a mechanical dithering mechanism as a DC bias for the rotation. However, this approach necessarily increases the size, weight and cost of the RGL.

Another approach introduces anisotropy in the ring using magnetic mirrors or phase modulation. Such an approach is based on using two or more reflectors, vibrating linearly in a certain synchronized mechanism. Yet another approach moves the reflectors in a tilting fashion. To eliminate the mechanical noise from the mechanical movement of the reflectors, a solution based on quantum well mirrors has also been proposed. However, all of these approaches utilize a volume optic configuration, which necessarily increases the size and cost of the RLG. In addition, due to the increased size, optical alignment and synchronization of the different mirror configurations may be difficult.

Therefore, there is a need for an RLG with a reduced size and cost that also reduces lock-in.

SUMMARY OF THE INVENTION

Embodiments of the present invention provide a ring laser gyroscope including an active gain medium for generating first and second light beams, a closed optical path through which the first and second light beams counter-propagate, first and second moveable mirrors within the closed optical path and a Micro-Electro-Mechanical Systems (MEMS) actuator coupled to the first and second moveable mirrors to cause a respective displacement thereof that induces a phase modulation on the first and second light beams relative to one another, thereby creating an optical path difference between the first and second light beams corresponding to a virtual rotation to reduce the lock-in.

In one embodiment, the active gain medium includes a semiconductor laser. In another embodiment, the active gain medium includes a fiber amplifier. In either embodiment, the first and second mirrors may be metallic or dielectric and may be moveable in the same direction or in opposite directions. In addition, a single MEMS actuator may control both the first and second mirrors or each mirror may be separately controlled by a different MEMS actuator.

In a further embodiment, one or more additional mirrors may be placed in the closed optical path to direct the light beams. In such an embodiment, the first and second mirrors may be corner cube mirrors.

In still a further embodiment, the first and second mirrors and the MEMS actuator may be fabricated on a silicon on insulator (SOI) wafer. The active gain medium may be further fabricated on the SOI wafer or on a separate SOI wafer. When the active gain medium is fabricated on a separate SOI wafer, the closed optical path may further include an optical fiber coupled between the two SOI wafers.

In yet another embodiment, the RLG further includes a detector coupled to the closed optical path to detect a beat pattern caused by the first and second light beams counter-propagating through the closed optical path and a processor coupled to the detector to determine an angular rotation rate based on the beat pattern. In an exemplary embodiment, a mirror that is at least partially transmissive within the closed optical path directs the first and second light beams towards the detector. In another exemplary embodiment, a coupler within the closed optical path splits the first and second light beams such that the first light beam propagates in a first direction in the coupler and the second light beam propagates in a second direction in the coupler and then recombines the first and second light beams at the detector to create an interference pattern thereon. For example, the coupler may include one or more of an optical fiber coupler, a prism coupler and a directional coupler.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a miniaturized ring laser gyroscope (RLG) is provided using optical Micro-Electro-Mechanical Systems (MEMS) technology. The RLG includes an active gain medium (e.g., a semiconductor laser) and at least two mirrors placed within a closed optical path, which can be a free space propagation using various geometrical configurations of mirrors and/or a guided wave propagation using an optical fiber or any equivalent optical waveguide. When using free space propagation, the entire RLG system can be implemented monolithically on a single chip. Two of the mirrors are mechanically coupled to one or more MEMS actuators to achieve various mirror positions. By using MEMS fabrication technology, the MEMS mirrors can be easily synchronized and driven at relatively high speeds. The phase modulation induced by moving the MEMS mirrors relative to one another can reduce the lock-in of the RLG, which enables extremely low rotation rates to be measured.

Figure 1A:
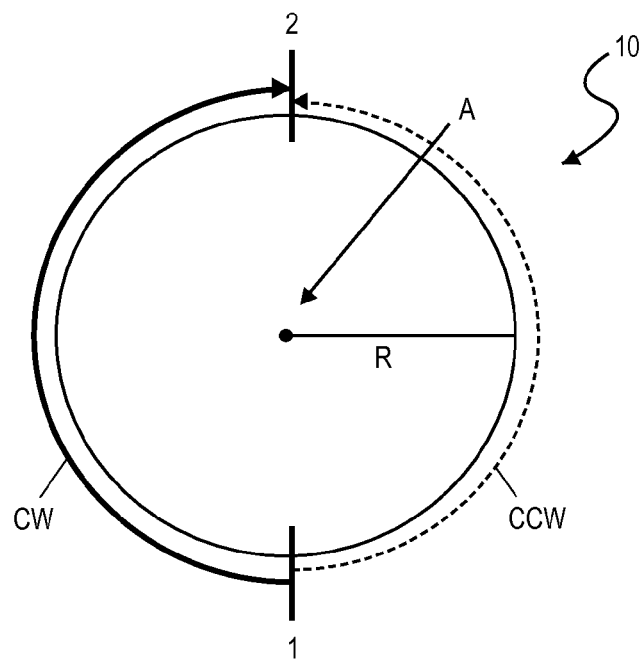
FIGS. 1A and 1B are schematic block diagrams of an exemplary operation of a ring laser gyroscope, in accordance with embodiments of the present invention.
Figure 1B:
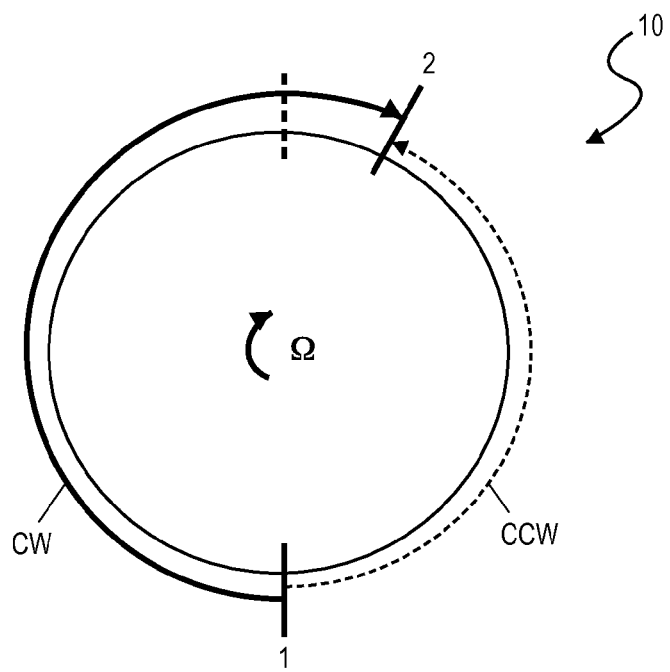

Referring now to FIGS. 1A and 1B, there is illustrated an exemplary operation of a ring laser gyroscope (RLG) 10, which may be a MEMS-based RLG in accordance with embodiments of the present invention. The RLG 10 measures the angular rate of rotation about an axis by generating two light beams that travel along the same closed optical path but in opposite directions: one clockwise (CW) and one counter-clockwise (CCW). In the absence of rotation, as shown in FIG. 1A, the optical path length experienced by each light beam will be the same (e.g., from position 1 to position 2), and therefore the round trip propagation time (t) around the ring for each beam can be expressed as:

$$t = \frac{2\pi R}{c}, \quad \text{(Equation 1)}$$

where R is the radius of the ring cavity and c is the speed of light.

However, if the RLG 10 rotates, as shown in FIG. 1B, an optical path length difference is experienced by the light beams. For example, as can be seen in FIG. 1B, if the RLG 10 rotates clockwise, the CW beam has farther to go from position 1 to reach position 2, and the path of the CCW beam becomes shorter. Thus, the round trip propagation time around the ring for the CW beam can be expressed as:

$$t_1 = \frac{2\pi R}{c - R\Omega}, \quad \text{(Equation 2)}$$

where $\Omega$ is the angular rate of rotation of the RLG 10. Likewise, the round trip propagation time around the ring for the CCW beam can be expressed as:

$$t_2 = \frac{2\pi R}{c + R\Omega} \quad \text{(Equation 3)}$$

The optical path length difference $\Delta OPL$ can then be expressed as:

$$\Delta OPL = c(t_1 - t_2) \approx \frac{4\pi R^2 \Omega}{c} = \frac{4A\Omega}{c'} \quad \text{(Equation 4)}$$

where A is the area of the ring cavity.

This rotationally induced variance in path length produces a phase difference, and hence an optical frequency difference ($\Delta v$), between the light beams, which can be expressed as:

$$\Delta v = \frac{4A\Omega}{\lambda L}, \quad \text{(Equation 5)}$$

With a ring having a medium other than air, the refractive index of the medium n is added, and Equation 5 can be reformulated as:

$$\Delta v = \frac{4A\Omega}{n\lambda L} \quad \text{(Equation 6)}$$

where $\lambda$ is the wavelength of the light beams and L is the ring perimeter. The difference in frequency introduces a motion of the standing wave pattern within the ring, and thus a beat pattern when the two beams are interfered outside of the ring. The number of beats during a time interval is directly proportional to the rotation rate and the direction of pattern movement is indicative of the rotational direction.

RLG's typically suffer from an effect known as "lock-in" at very slow rotation rates. When the ring laser is barely rotating, the frequencies of the counter-propagating beams become nearly identical. In this case, cross-talk between the beams can result in injection locking, which fixes the standing wave in a particular phase, thus locking the frequency of each beam to one another. To overcome the problem of lock-in, in accordance with embodiments of the present invention, MEMS technology is used to induce a phase modulation on the CW and CCW beams relative to one another outside of the lock-in band.

Figure 2:
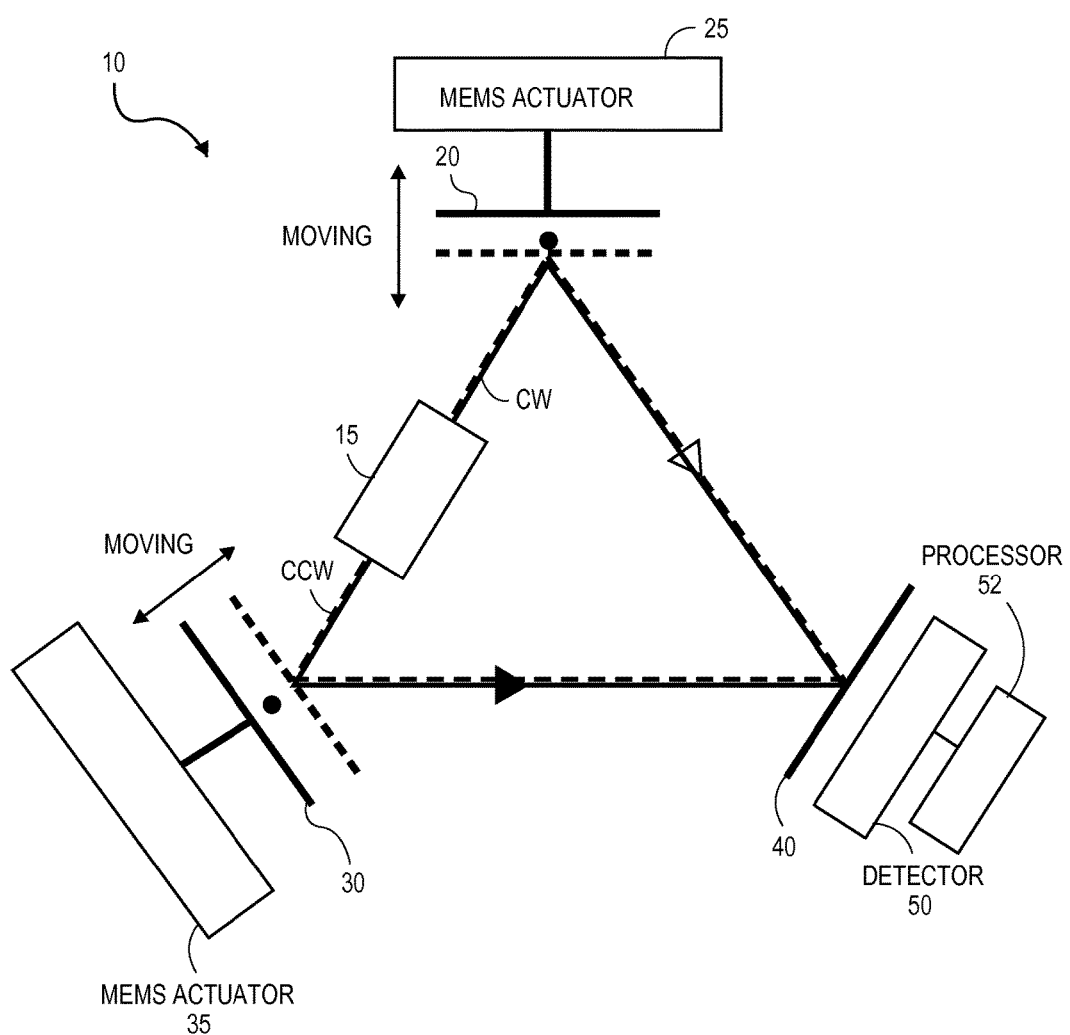
FIG. 2 is a schematic block diagram illustrating an exemplary configuration of a Micro-Electro-Mechanical Systems (MEMS)-based ring laser gyroscope (RLG), in accordance with embodiments of the present invention.
Figure 8:
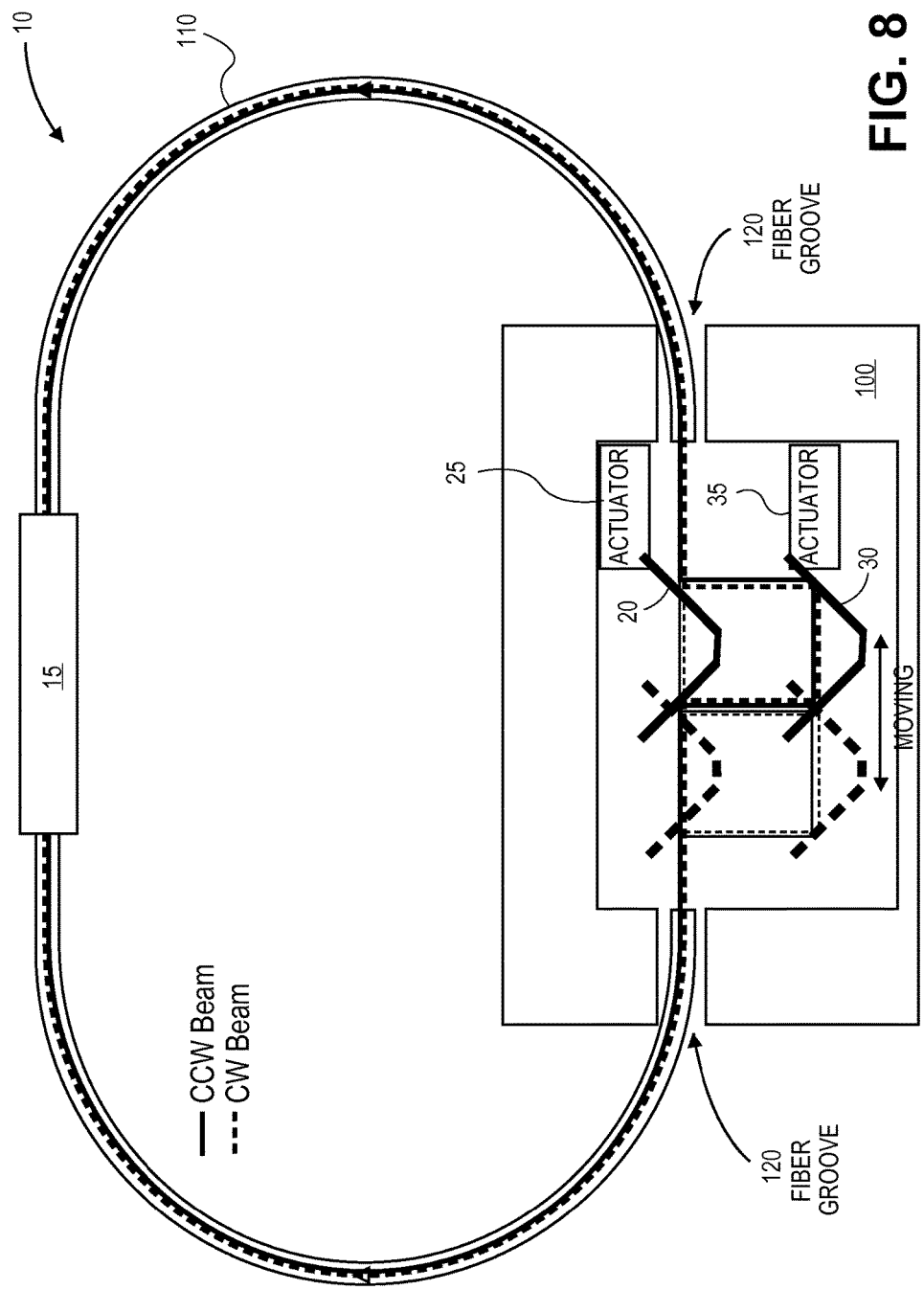
FIG. 8 is a schematic block diagram illustrating an exemplary configuration of a MEMS-based RLG with an optical fiber ring, in accordance with the present invention.
Figure 9:
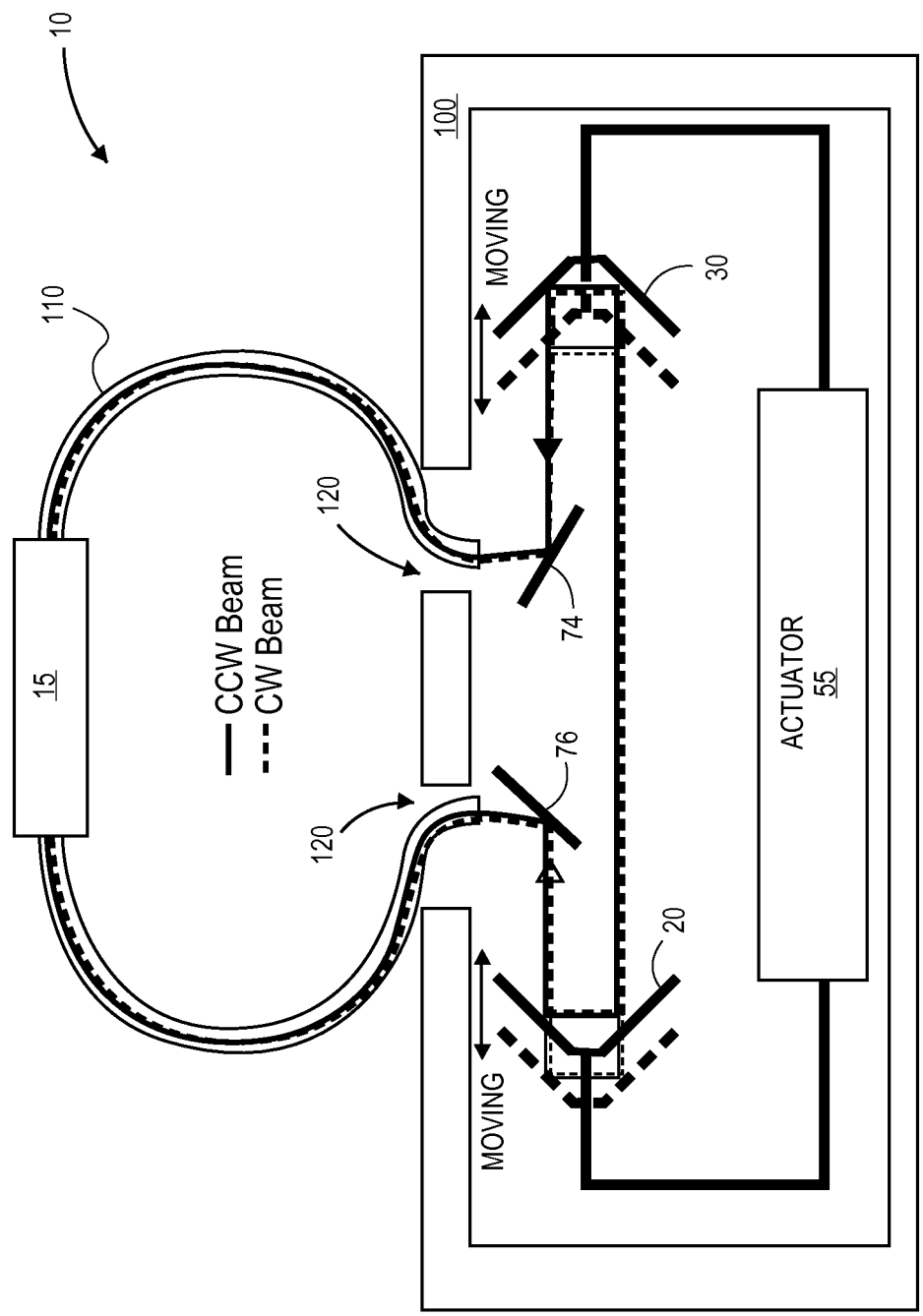
FIG. 9 is a schematic block diagram illustrating another exemplary configuration of the MEMS-based RLG with optical fiber ring, in accordance with embodiments of the present invention.
Figure 10:
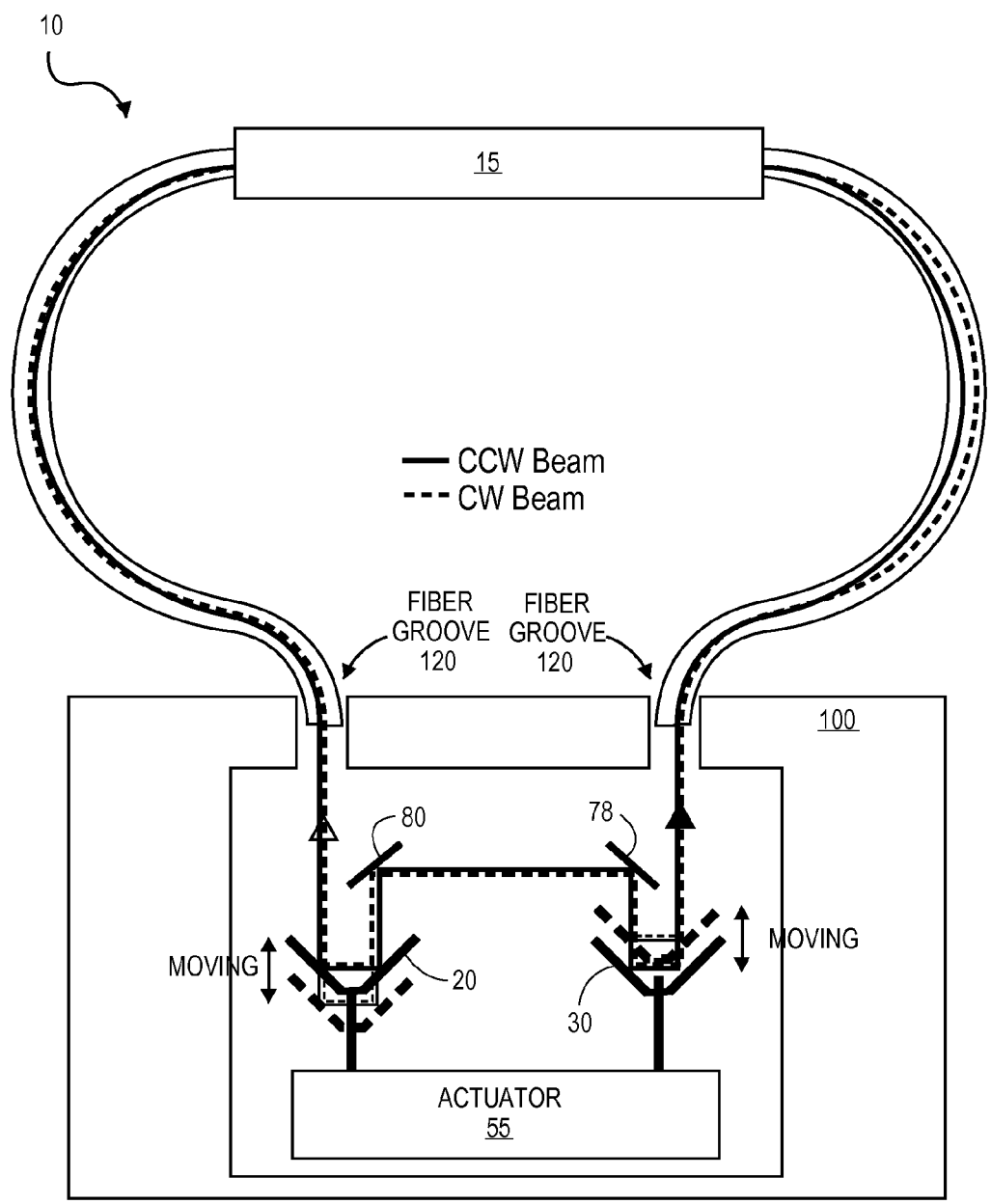
FIG. 10 is a schematic block diagram illustrating yet another exemplary configuration of the MEMS-based RLG with optical fiber ring, in accordance with embodiments of the present invention.

Referring now to FIG. 2, there is illustrated an exemplary MEMS-based ring laser gyroscope (RLG) 10, in accordance with embodiments of the present invention. The MEMS-based RLG 10 includes an active gain medium 15, mirrors 20, 30 and 40, MEMS actuators 25 and 35, a detector 50 and a processor 52. By way of example, but not limitation, the active gain medium 15 can include a semiconductor laser, laser diode chip, semiconductor optical amplifier, fiber amplifier (in embodiments utilizing an optical fiber, as shown in FIGS. 8-10) or any other type of miniaturized laser system compatible with MEMS technology. In addition, more than one active gain medium 15 may be used to increase the generated optical power. The active gain medium 15 may also be coated with an AR coating to minimize the reflection loss in the RLG 10 and avoid perturbing the resonance of the RLG 10.

Figure 3:
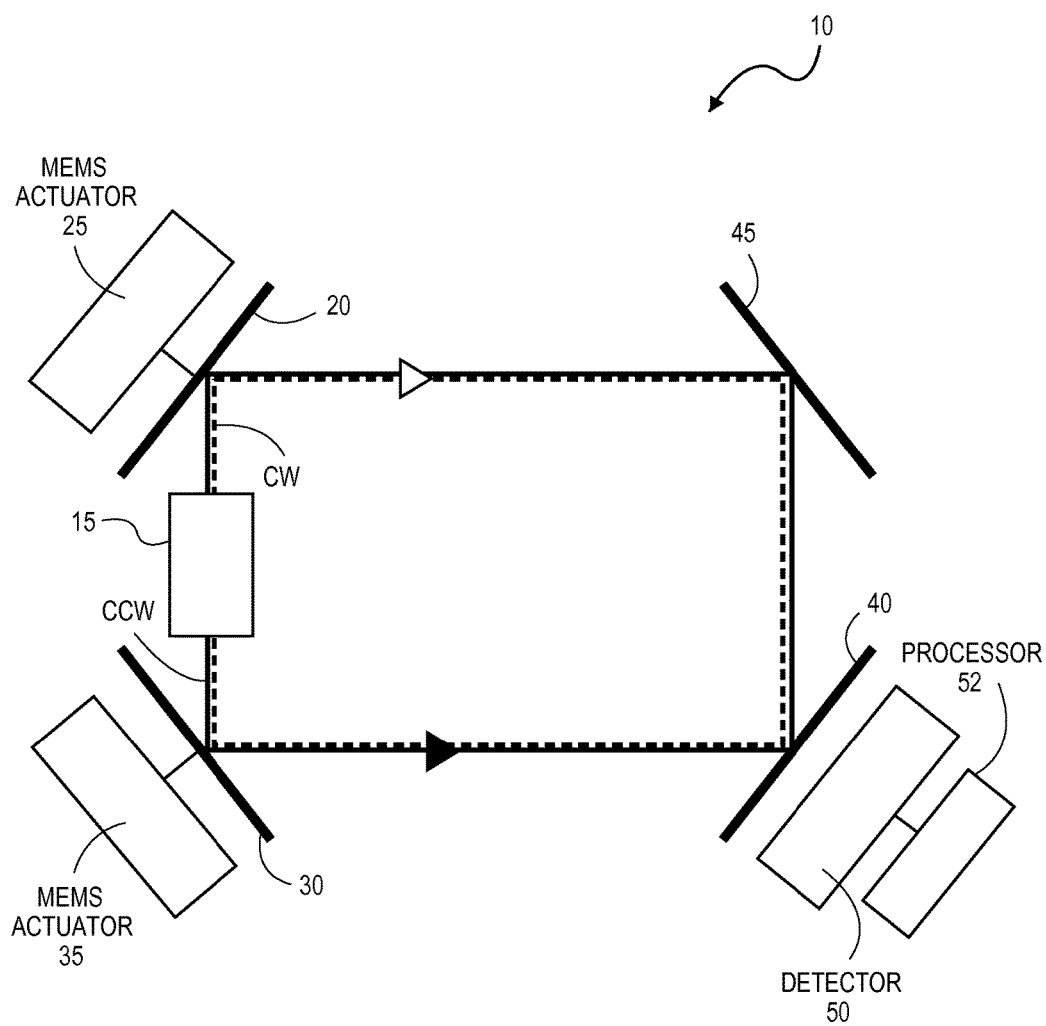
FIG. 3 is a schematic block diagram illustrating another exemplary configuration of a MEMS-based RLG, in accordance with embodiments of the present invention.

The gain medium 15, together with mirrors 20, 30 and 40 collectively form a closed optical path in free space, using mirrors 20, 30 and 40 for optical beam guiding. Mirrors 20 and 30 are fully reflective mirrors and may each be, for example, a metallic mirror, a dielectric mirror using multi-layer coatings and/or any other type of mirror. In one embodiment, as shown in FIG. 3, mirror 40 is at least partially transmissive over the wavelengths of interest to direct the output to the detector 50. For example, mirror 40 may be a Fiber Bragg Grating (FBG). In another embodiment, mirror 40 is a fully reflective mirror and the output is measured at the gain medium 15. In addition, each of the mirrors 20, 30 and 40 may be a flat mirror, a curved mirror, a cylindrical mirror, a spherical mirror, a corner cube mirror or any other shape of mirror.

The MEMS actuators 25 and 35 are electrostatic actuators, such as comb drive actuators, parallel plate actuators or other type of electrostatic actuators. Mirror 20 is coupled to MEMS actuator 25, such that motion of the MEMS actuator 25 causes a displacement in the position of mirror 20. Mirror 30 is coupled to MEMS actuator 35, such that motion of the MEMS actuator 35 causes a displacement in the position of mirror 30. As explained in more detail below, displacement of the moveable MEMS mirrors 20 and 30 reduces lock-in in the RLG 10.

In an exemplary operation, the gain medium 15 generates a clockwise (CW) light beam and a counter-clockwise (CCW) light beam and counter-propagates the CW and CCW light beams (e.g., transmits the CW and CCW beams in opposite directions) through the closed optical path. The MEMS actuators 25 and 35 each operate to move MEMS mirrors 20 and 30 to induce a phase modulation on the CW and CCW beams relative to one another as the CW and CCW beams are reflected off mirrors 20 and 30 towards mirror 40. The induced phase modulation on the CW and CCW beams reduces the lock-in band by creating an optical path difference between the two counter propagating beams, as if the RLG 10 is rotating.

In one embodiment, mirror 40 directs the CW and CCW beams towards detector 50 and enables an interference pattern to be created thereon. In this embodiment, the detector 50 is a photodetector capable of detecting the interference pattern and generating an output signal indicative thereof. The processor 52 receives the output signal from the detector 50 (corresponding to the interference pattern) and performs a spectrum analysis of the interference pattern, with knowledge of the induced phase modulation, to determine the angular rate of rotation of the RLG 10.

In another embodiment, the detector 50 may be coupled to the gain medium 15 to directly measure the electrical beating signal on the gain medium 15 and provide the measured signal to the processor 52. The processor 52 determines the angular rate of rotation of the RLG 10 from the measured signal. In either embodiment, the processor 52 may further control operation of the MEMS actuators 25 and 35.

The processor 52 may be a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor 52 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

In an exemplary embodiment, the MEMS actuators 25 and 35, mirrors 20, 30 and 40 and gain medium 15 are fabricated using MEMS technology, which allows the RLG 10 to have an integrated form. For example, the mirrors 20, 30 and 40 and MEMS actuators 25 and 35 can be monolithically fabricated by an etching technology, such as a Deep Reactive-Ion Etching (DRIE) process, and self-aligned by a lithography alignment process on a Silicon on Insulator (SOI) wafer/substrate, a GaAs wafer/substrate or any other semiconductor or dielectric wafer/substrate. The gain medium 15 may be inserted into a groove also fabricated in the same production step as the mirrors 20, 30 and 40 and actuators 25 and 35 by the DRIE process to ensure alignment of the gain medium 15 with the mirrors 20, 30 and 40. In addition, the detector 50 may be assembled through micro-machining in the substrate (e.g., by etching the top surface of the substrate to realize an opening within which the detector may be placed) or realized monolithically within the substrate either through doping (e.g., to realize a P-I-N diode) or partial metallization (e.g., to realize metal-semiconductor-metal MSM detector). In another embodiment, one or more of the mirrors 20, 30 and 40 may be fabricated by selective deposition on the wafer.

The RLG 10 shown in FIG. 2 has a triangular configuration. However, in other embodiments, the RLG 10 may have a circular configuration or a rectangular configuration, the latter being shown in FIG. 3. In FIG. 3, MEMS mirrors 20 and 30 and mirror 45 are fully reflective, while mirror 40 is partially transmissive to direct the output to the detector 50 and processor 52. However, in other embodiments, mirror 40 may be fully reflective and the output may be detected at the active gain medium 15. MEMS actuators 25 and 35 operate to cause a displacement in the position of MEMS mirrors 20 and 30 to induce a phase modulation on the CW and CCW beams relative to one another, thereby reducing lock-in. It should be understood that with an increased number of mirrors, the RLG 10 may have a pentagonal, a hexagonal or any other geometrical closed loop configuration.

Figure 4:
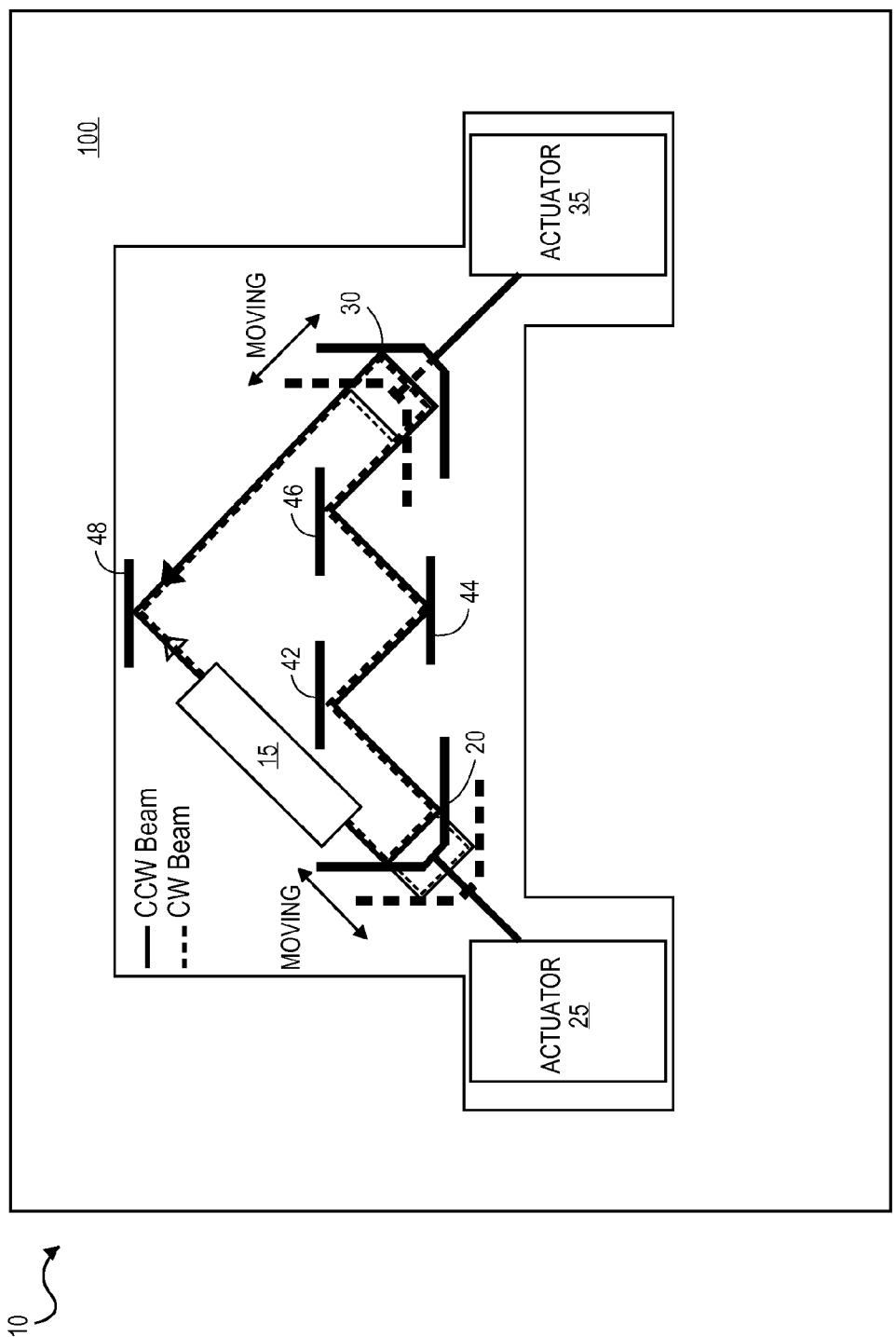
FIG. 4 is a schematic block diagram of yet another exemplary configuration of the MEMS-based RLG, in accordance with embodiments of the present invention.

FIG. 4 illustrates an embodiment of an RLG 10 in which the MEMS actuators 25 and 35, active gain medium 15 and MEMS mirrors 20 and 30 are fabricated on the same substrate 100, such as a MEMS integrated circuit (MEMS chip). The RLG cavity (and hence, closed optical path) has a triangular shape formed of the active gain medium 15, MEMS mirrors 20 and 30 and fixed mirrors 42, 44, 46 and 48. Fixed mirrors 42-46 are shown as flat mirrors. However, it should be understood that any other number and/or shape of fixed mirrors may be used.

MEMS mirrors 20 and 30 are corner cube reflectors, each including two mirrors placed at right angles to one another such that a beam incident from any direction in the plane perpendicular to both mirrors is reflected through 180 degrees. More specifically, each MEMS mirror 20 and 30 receives the CW or CCW beam on one mirror of the corner cube reflector and reflects the CW or CCW beam from the other mirror of the corner cube reflector.

For example, MEMS corner cube reflector 20 receives the CCW beam from the active gain medium 15 on one mirror thereof and reflects the CCW beam on the other mirror thereof towards mirror 42. Fixed mirrors 42-46 are positioned to direct the CCW beam towards MEMS mirror 30. MEMS corner cube reflector 30 receives the CCW beam from mirror 46 on one mirror thereof and reflects the CCW beam on the other mirror thereof towards mirror 48. The CW beam propagates in the opposite direction, reflecting from mirror 48 towards MEMS corner cube reflector 30 and then towards MEMS corner cube reflector 20 via fixed mirrors 42-46. MEMS actuators 25 and 35 operate to cause a displacement in the position of mirrors 20 and 30 to create an optical path length difference between the CW and CCW beams corresponding to a virtual rotation and induce a phase modulation on the CW and CCW beams relative to one another.

Figure 5:
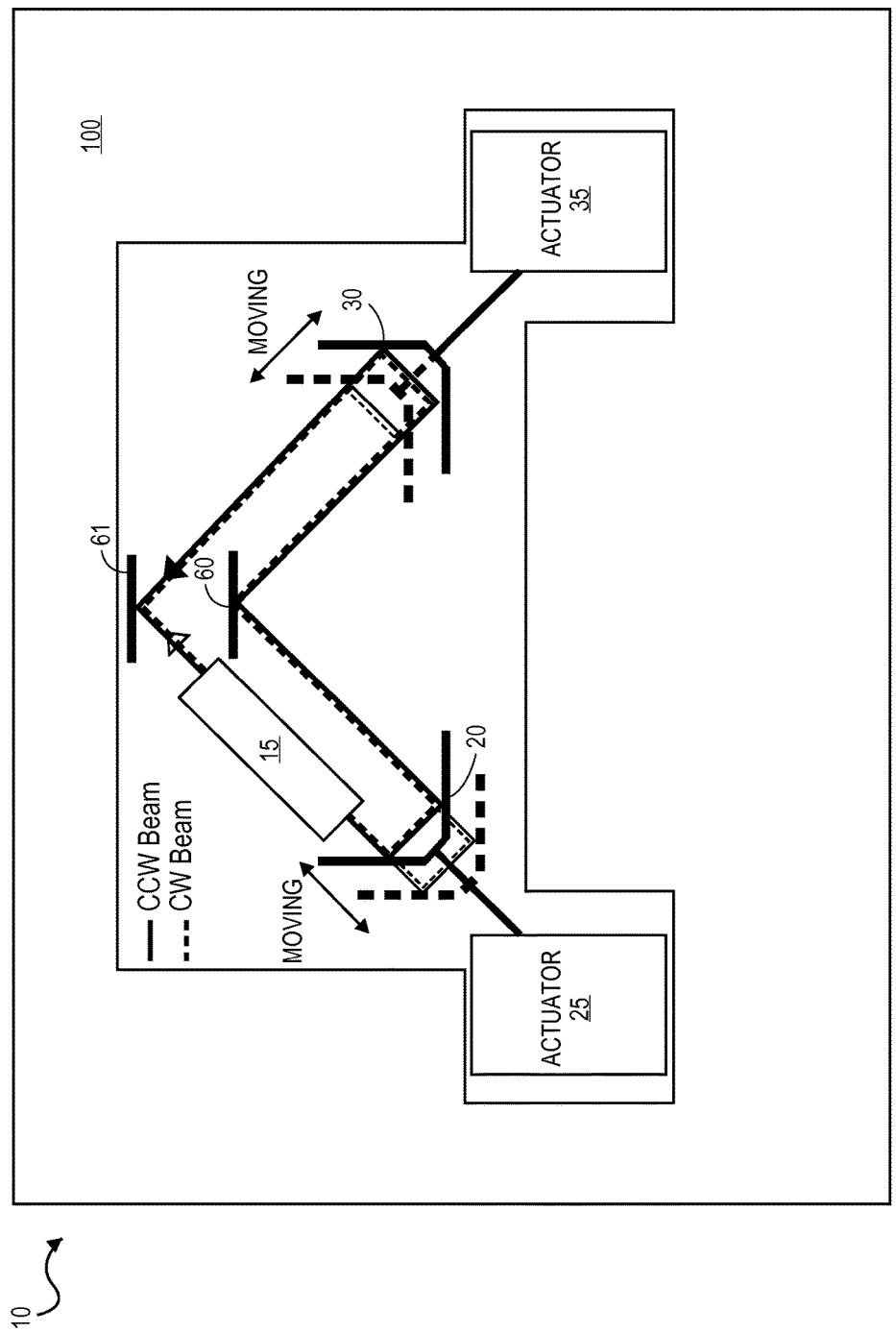
FIG. 5 is a schematic block diagram illustrating still another exemplary configuration of the MEMS-based RLG, in accordance with embodiments of the present invention.

FIG. 5 illustrates another embodiment of a triangular-shaped RLG 10. In FIG. 5, a single fixed mirror 60 is used to reflect the CW and CCW beams between MEMS corner cube reflectors 20 and 30 and another mirror 61 is used to reflect the CW and CCW beams between the active gain medium 15 and MEMS corner cube reflector 30. In FIGS. 4 and 5, the MEMS mirrors 20 and 30 are separately controlled by the MEMS actuators 25 and 35.

Figure 6:
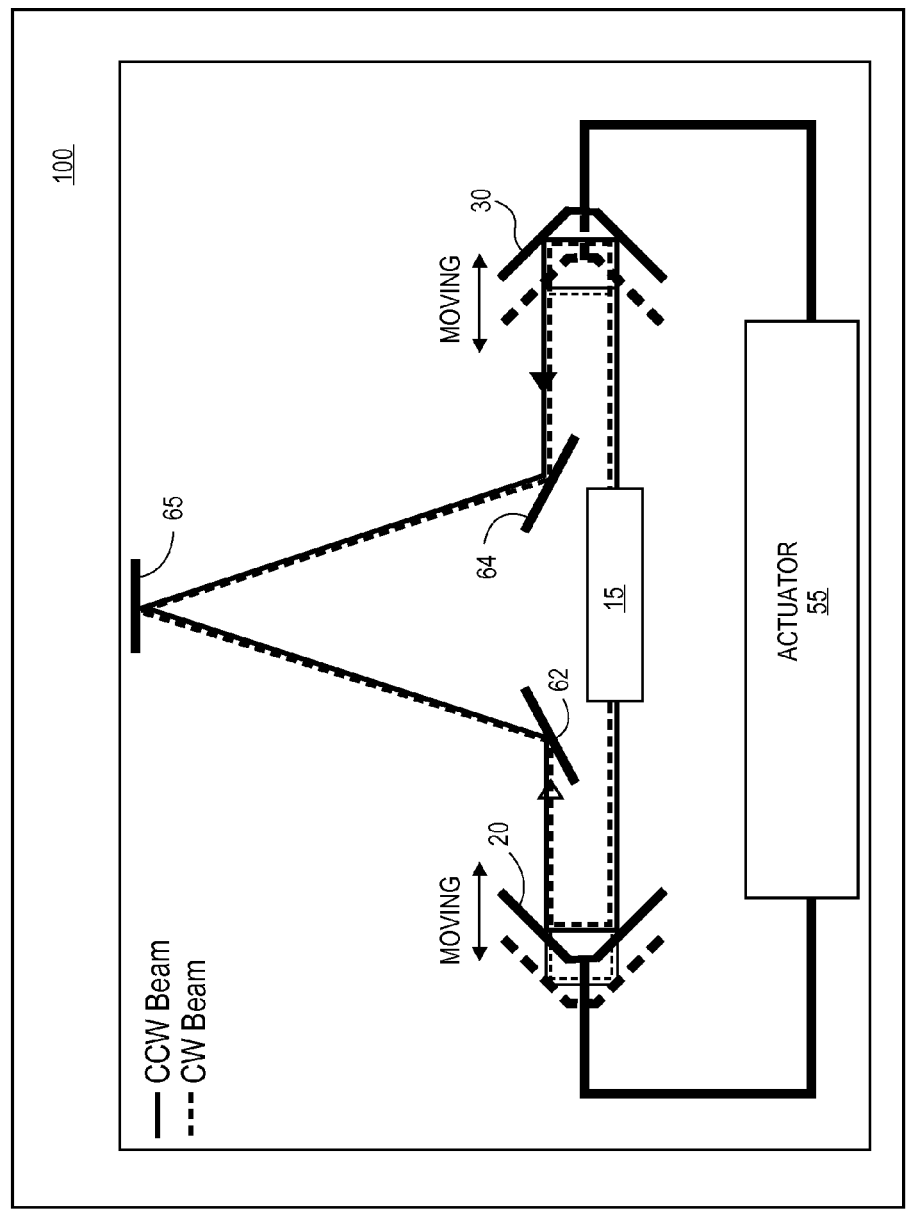
FIG. 6 is a schematic block diagram illustrating a further exemplary configuration of the MEMS-based RLG, in accordance with embodiments of the present invention.

In another embodiment, as shown in FIG. 6, a single MEMS actuator 55 may be used to control both MEMS mirrors 20 and 30. The RLG configuration shown in FIG. 6 also has a triangular shape, with the active gain medium 15, MEMS mirrors 20 and 30 and fixed mirrors 62, 64 and 65 forming the closed optical path. In addition, MEMS mirrors 20 and 30 are corner cube reflectors that reflect the CW and CCW beams through 180 degrees between the active gain medium 15 and respective fixed mirrors 62 and 64.

In the embodiment shown in FIG. 6, the MEMS actuator 55 is designed to enable the MEMS mirrors 20 and 30 to move in the same direction. For example, as MEMS mirror 20 is moved closer to fixed mirror 62 and active gain medium 15 (to the right), MEMS mirror 30 also moves to the right away from fixed mirror 64 and active gain medium 15.

Figure 7:
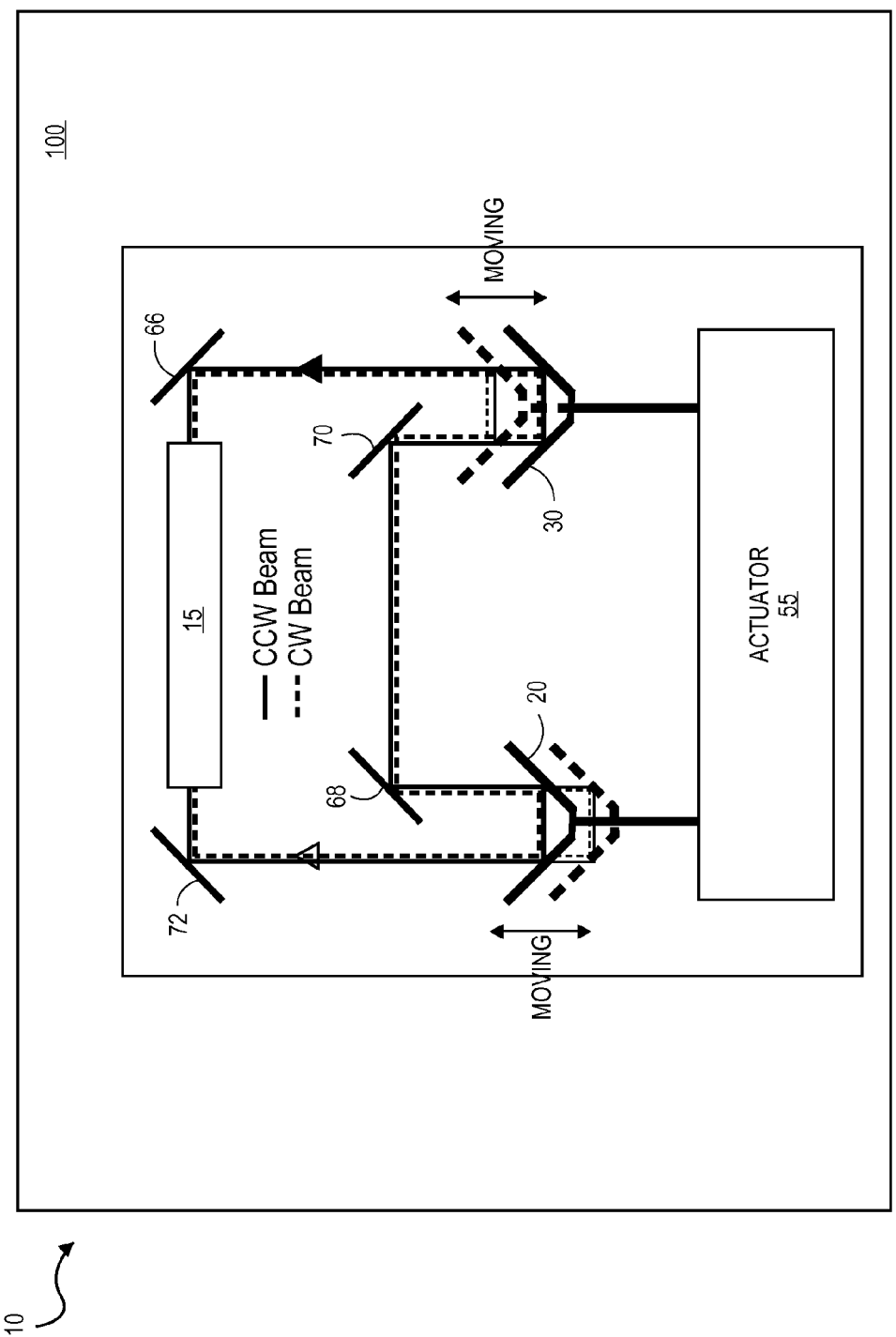
FIG. 7 is a schematic block diagram illustrating still a further exemplary configuration of the MEMS-based RLG, in accordance with embodiments of the present invention.

In other embodiments, as shown in FIG. 7, the MEMS actuator 55 may be designed to enable the MEMS mirrors 20 and 30 to move in opposite directions. For example, as can be seen in FIG. 7, as MEMS mirror 30 is moved closer to the MEMS actuator 55, mirror 20 moves away from the MEMS actuator 55. FIG. 7 also illustrates an embodiment of a rectangular-shaped RLG 10 with the active gain medium 15, MEMS actuator 55, MEMS mirrors 20 and 30 and fixed mirrors 66, 68, 70 and 72 fabricated on the same substrate 100. It should be noted that in any of the above RLG configurations shown in FIGS. 4-7, the number of fixed mirrors may vary depending on the angles of the fixed mirrors. In addition, it should be noted that the MEMS mirrors 20 and 30 may be moved in any arbitrary manner, such that the MEMS mirrors 20 and 30 are displaced simultaneously with arbitrary phase shift therebetween.

Although the RLG configurations shown in FIGS. 4-7 are monolithic and can be integrated with the active gain medium on one chip, the optical path length is limited to the RLG chip area, which in turn may limit the sensitivity of the RLG 10. Therefore, in another embodiment, as shown in FIG. 8, an optical waveguide 110, such as an optical fiber, may be used to guide the CW and CCW beams through the closed optical path between the active gain medium 15 and MEMS mirrors 20 and 30. In this embodiment, two chips, one for the active gain medium 15 and another for the MEMS mirrors 20 and 30 and the corresponding MEMS actuators 25 and 35 may be connected using the optical fiber 110 in a ring configuration. Such a configuration can increase the scale factor and improve the RLG 10 sensitivity by increasing the area enclosed by the fiber loop.

In FIG. 8, fiber grooves 120 on either side of the MEMS chip 100 receive respective ends the optical fiber 110. MEMS mirrors 20 and 30 are configured to form an optical path in free space through the MEMS chip 100. MEMS mirrors 20 and 30 are corner cube reflectors, with MEMS mirror 20 being designed to reflect from the opposite (back) side.

In an exemplary operation, as the CW beam enter the MEMS chip 100 from one end of the optical fiber 110, the CW beam propagates in free space towards MEMS mirror 20. MEMS mirror 20 reflects the CW beam towards MEMS mirror 30, which in turn reflects the CW beam back towards MEMS mirror 20. MEMS mirror 20 then reflects the CW beam towards the other end of the optical fiber 110. The MEMS actuators 25 and 35 operate to move the MEMS mirrors in the same direction, such that the MEMS mirrors 20 and 30 remain aligned with one another.

FIG. 9 illustrates another embodiment of an RLG 10 using an optical fiber 110 to propagate the CW and CCW beams between the active gain medium 15 and the MEMS mirrors 20 and 30. In FIG. 9, a single MEMS actuator 55 is used to control movement of both MEMS mirrors 20 and 30. Fixed mirrors 74 and 76 within MEMS chip 100 direct the CW and CCW beams between the optical fiber 110 and the MEMS mirrors 20 and 30. The MEMS actuator 55 is designed to move MEMS mirrors 20 and 30 in the same direction. For example, as MEMS mirror 20 moves to the left (away from fixed mirror 76), MEMS mirror 30 also moves to the left (towards fixed mirror 74).

In another embodiment, as shown in FIG. 10, the MEMS actuator 55 can be designed to move the MEMS mirrors 20 and 30 in opposite directions. In the configuration shown in FIG. 10, fixed mirrors 78 and 80 are positioned to reflect the CW and CCW beams between MEMS mirrors 20 and 30. As MEMS mirror 20 moves closer to fixed mirror 80 (and away from MEMS actuator 55), MEMS mirror 30 moves away from fixed mirror 78 (and towards MEMS actuator 55).

Figure 11:
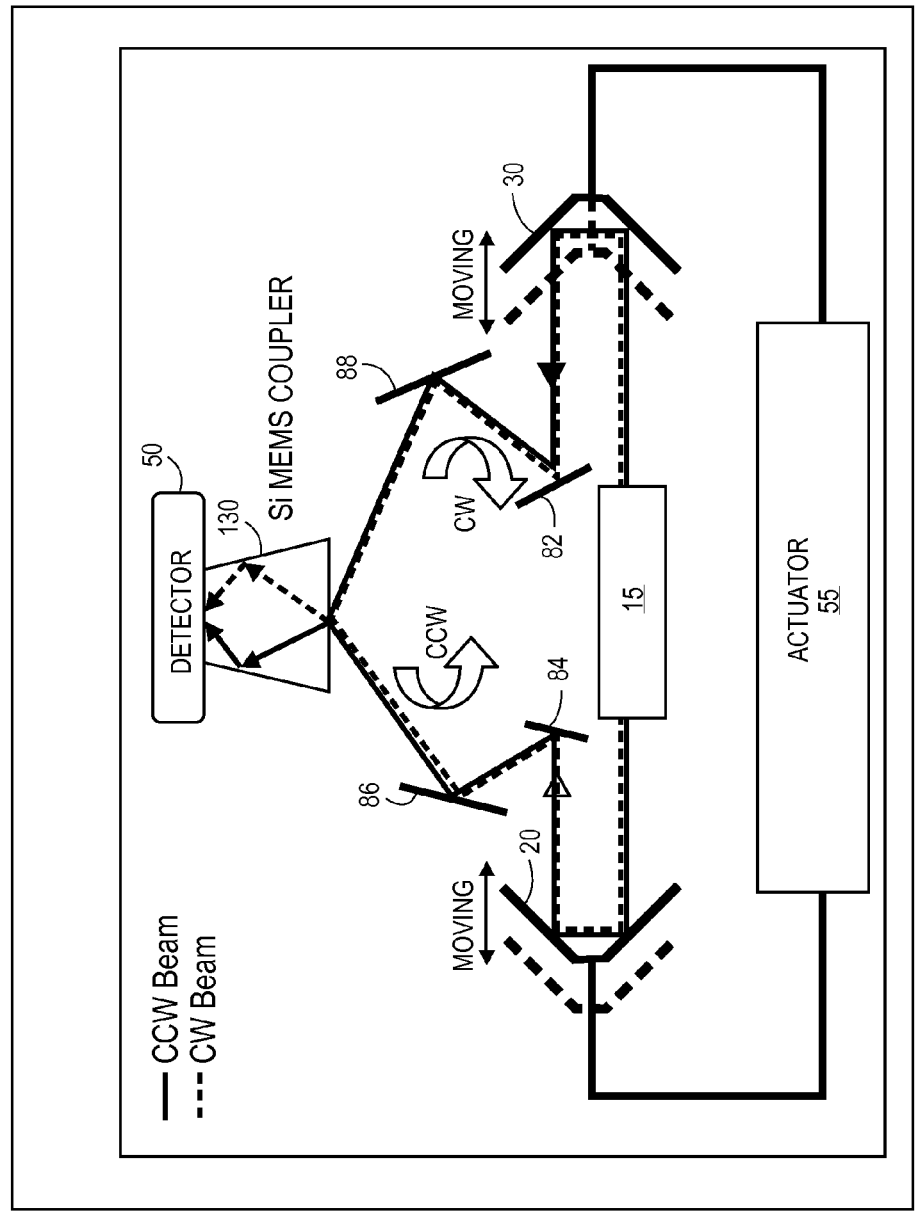
FIG. 11 is a schematic block diagram illustrating an exemplary configuration of a MEMS-based RLG with integrated detector, in accordance with embodiments of the present invention.

In any of the above RLG configurations shown in FIGS. 4-10, as described above in connection with FIGS. 2 and 3, the output signal can be measured either using a photodetector coupled to the optical path through, for example, one or more of a partially transmissive mirror, a beam splitter, a directional coupler, an optical fiber coupler and a prism coupler, or by directly measuring the electrical beating signal on the active gain medium 15. For example, as shown in FIG. 11, a prism coupler 130 can be fabricated using the same MEMS technology and on the same chip 100 as the MEMS mirrors 20 and 30 and MEMS actuator 55 in order to be self-aligned with the MEMS mirrors 20 and 30. In an exemplary embodiment, the prism coupler 130 can be fabricated with the MEMS mirrors 20 and 30 and MEMS actuator 55 by etching (using, e.g., DRIE) and self-aligned with the MEMS mirrors 20 and 30 and the MEMS actuator 55 by a lithography alignment process on a SOI wafer.

In FIG. 11, fixed mirrors 82, 84, 86 and 88 direct the CW and CCW beams towards the prism coupler 130. The prism coupler 130 operates to split the CW and CCW beams and recombine the CW and CCW beams at the detector 50 to create an interference pattern thereon. The MEMS actuator 55 is coupled to the MEMS mirrors 20 and 30 to move the MEMS mirrors 20 and 30 with respect to one another in order to induce a variance in the optical path length between the CW and CCW beams that reduces lock-in of the RLG 10.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A ring laser gyroscope, comprising:
    an active gain medium for generating first and second light beams;
    a closed optical path through which the first and second light beams counter-propagate;
    first and second moveable mirrors within the closed optical path;
    a Micro-Electro-Mechanical Systems (MEMS) actuator coupled to the first and second moveable mirrors to cause a respective displacement thereof that induces an induced phase modulation on the first and second light beams relative to one another, thereby creating a modulated optical path length difference between the first and second light beams corresponding to a virtual rotation to reduce the lock-in, wherein the MEMS actuator is configured to continuously displace the first and second mirrors with a pre-defined motion profile and with arbitrary phase shift therebetween to produce the induced phase modulation;
    wherein the first and second moveable mirrors are corner cube mirrors, wherein each of the corner cube mirrors includes two flat mirrors placed at right angles to each other, wherein displacement of the corner cube mirrors by the MEMS actuator changes an optical path length experienced by the first and second light beams without changing the closed optical path through which the first and second light beams propagate;
    wherein the first and second corner cube mirrors are mechanically coupled together and actuated by a single MEMS actuator to achieve fully synchronized out-of-phase motion with equal mirror displacement;
    a semiconductor substrate including the first and second moveable mirrors and the MEMS actuator therein;
    a detector coupled to the closed optical path to detect a beat pattern caused by the first and second light beams counter-propagating through the closed optical path; and
    a processor coupled to the detector to receive the beat pattern and configured to determine the induced phase modulation based on the pre-defined motion profile, the processor further configured to determine an angular rotation rate of the ring laser gyroscope by eliminating the induced phase modulation from the beat pattern.

2. The ring laser gyroscope of claim 1, wherein the closed optical path has a geometrical configuration, wherein the geometrical configuration is a circular configuration, a triangular configuration, a rectangular configuration or another geometric closed loop configuration.

3. The ring laser gyroscope of claim 1, wherein the active gain medium includes a semiconductor optical amplifier.

4. The ring laser gyroscope of claim 1, wherein the active gain medium includes a fiber amplifier.

5. The ring laser gyroscope of claim 1, wherein at least one of the first mirror and the second mirror is a metallic mirror.

6. The ring laser gyroscope of claim 1, wherein at least one of the first mirror and the second mirror is a dielectric mirror.

7. The ring laser gyroscope of claim 1, further comprising:
    at least three mirrors, including the first and second moveable mirrors, wherein the at least three mirrors and the MEMS actuator are monolithically fabricated on the substrate using a lithography alignment process such that the at least three mirrors and the MEMS actuator are self-aligned as a result of the lithography alignment process and the first and second light beams are propagating parallel to the substrate.

8. The ring laser gyroscope of claim 1, wherein the semiconductor substrate further includes the active gain medium therein.

9. The ring laser gyroscope of claim 1, further comprising:
    an additional semiconductor substrate within the closed optical path and external to the semiconductor substrate including the first and second moveable mirrors and the MEMS actuator, wherein the active gain medium is included in the additional semiconductor substrate.

10. The ring laser gyroscope of claim 9, wherein the closed optical path includes an optical fiber coupled between the semiconductor substrate and the additional semiconductor substrate.

11. The ring laser gyroscope of claim 1, wherein the first and second mirrors are displaced in opposite directions.

12. The ring laser gyroscope of claim 1, wherein the closed optical path includes at least one additional mirror to direct the first and second light beams along the closed optical path.

13. The ring laser gyroscope of claim 1, further comprising:
    an additional mirror within the closed optical path, the additional mirror being at least partially transmissive to direct the first and second light beams towards the detector.

14. The ring laser gyroscope of claim 1, further comprising:
    a coupler within the closed optical path for splitting the first and second light beams such that the first light beam propagates in a first direction in the coupler and the second light beam propagates in a second direction in the coupler, the coupler further for recombining the first and second light beams at the detector to create an interference pattern thereon.

15. The ring laser gyroscope of claim 14, wherein the coupler includes a prism coupler or a beam splitter monolithically fabricated on a substrate with the first and second moveable mirrors and the MEMS actuator and self-aligned with the first and second moveable mirrors and the MEMS actuators by a lithography alignment process.

16. The ring laser gyroscope of claim 1, wherein the induced phase modulation is produced without rotation of the semiconductor substrate.

* * * * *